United States Patent [19]

Godfrey et al.

[11] Patent Number: 5,833,092
[45] Date of Patent: Nov. 10, 1998

[54] APPARATUS FOR FEEDING POORLY FLOWABLE DRY PARTICULATE MATERIALS

[75] Inventors: Scott E. Godfrey, Muscatine, Iowa;
Leonard L. Hierath, Denver, Colo.;
Mark E. Hillam, Westminster, Colo.;
Michael R. Schmehl, Denver, Colo.;
Charles F. Watson, Westminster, Colo.

[73] Assignee: Summit Machine Builders, Corp., Denver, Colo.

[21] Appl. No.: 803,219

[22] Filed: Feb. 20, 1997

[51] Int. Cl.⁶ ........................................... B67D 5/64
[52] U.S. Cl. ............................................ 222/168; 222/167
[58] Field of Search ........................... 222/167, 168, 222/228, 232, 238, 367; 141/129; 366/93; 414/795

[56] References Cited

U.S. PATENT DOCUMENTS

| | | | |
|---|---|---|---|
| 789,085 | 5/1905 | Daky . | |
| 2,016,767 | 10/1935 | Carlson | 131/39 |
| 2,606,693 | 8/1952 | Phillips | 222/168 |
| 2,775,371 | 12/1956 | Isserlis | 222/168 |
| 2,896,824 | 7/1959 | Sheldon | 222/168 |
| 3,260,415 | 7/1966 | Kozo et al. | 222/162 |
| 4,685,593 | 8/1987 | Loukos | 222/168 |
| 4,812,100 | 3/1989 | Lonardi et al. | 414/199 |

OTHER PUBLICATIONS

Defensive Publication T952,011 (Nov. 2, 1976) by G. Coote et al., "Powder Feeder".

*Primary Examiner*—Robert M. Fetsuga
*Assistant Examiner*—Timothy L. Maust
*Attorney, Agent, or Firm*—Michael R. Swartz; John R. Flanagan

[57] ABSTRACT

Apparatus for feeding poorly flowable dry particulate materials includes a rotary supply hopper having an interior chamber for receiving and containing a quantity of material and an annular sidewall open at a lower edge, a stationary platform having a circular groove formed in a top surface of the platform encircling an upright central axis and an opening extending through the platform adjacent to the circular groove, spaced from the central axis and defined between the circular groove and central axis, a support structure supporting the hopper above the platform to undergo rotation relative to the platform about the upright central axis with the lower edge of the supply hopper being spaced from and extending downward into the circular groove of the platform such that the platform serves as a stationary bottom for the rotary supply hopper, and an annular discharge spout attached at an open upper end to the platform below and encircling the opening through the platform and having a transfer passage extending from the open upper end to an open lower end so that material can undergo gravity-assisted flow downward through the platform opening and discharge spout passage for discharge at the open lower end of the discharge spout. The apparatus also includes a stripper blade rotatably mounted to the discharge spout and extending radially inward across the open lower end thereof for engaging discharging material to assist its movement away from the open lower end of the discharge spout.

33 Claims, 4 Drawing Sheets

APPARATUS FOR FEEDING POORLY FLOWABLE DRY PARTICULATE MATERIALS

BACKGROUND OF THE INVENTION

1. Field of the Invention

The present invention generally relates to material handling and feeding equipment and, more particularly, is concerned with apparatus for feeding fibrous and other dry particulate materials with poor flowability characteristics.

2. Description of the Prior Art

There are many fibrous and other dry particulate materials with poor flowability that have to be handled in order to transform them to the uses for which they were designed and intended to be applied. When such material with poor flowability needs to be dispensed, usually some means of mechanical agitation, vibration or air-jet aeration is used to cause the material to flow. If the material to be dispensed is a mixture of a range of particle sizes and materials of varying densities, the aforementioned dispensing methods can easily cause separation and segregation of the constituents of the mixture from one another.

One example of such materials with poor flowability is the friction mixtures used to manufacture automotive disk and drum brakes. Such automotive friction materials not only can separate and segregate but also can be highly abrasive to any mechanical parts which run in the mixture. Many of the automotive friction material formulations are difficult to feed or dispense. Some such formulations are highly dense with metallic fibers which tend to hang together. Other formulations can be low density and fluffy. Many formulations spring back when compressed slightly. This characteristic makes these materials bridge easily in a conical hopper and even in a straight vertical pipe. Many of these compressible materials cannot be successfully handled by augers or screw feeders.

A variety of material handling and feeding apparatuses are disclosed in the prior art. Representative examples of prior art apparatuses are disclosed in Dary U.S. Pat. No. (789,085), Carlson U.S. Pat. No. (2,016,167), Phillips U.S. Pat. No. (2,606,693), Isserlis U.S. Pat. No. (2,775,371), Sheldon U.S. Pat. No. (2,896,824), Kozo et al U.S. Pat. No. (3,260,415), Loukos U.S. Pat. No. (4,685,593) and Lonardi et al U.S. Pat. No. (4,812,100) and in a U.S. defensive publication to Coote et al (T952,011). These prior art apparatuses appear to lack the combination of features which would permit satisfactory feeding and dispensing of poorly flowable dry particulate materials, such as the mixtures of dry fibrous materials, without causing such degree of separation and segregation of their constituent parts from one another that would adversely impact the utility of the mixtures for their intended uses.

Consequently, a need exists for an apparatus which will overcome the drawbacks of the prior art without introducing new drawbacks in their place.

SUMMARY OF THE INVENTION

The present invention provides an apparatus for feeding poorly flowable dry particulate materials that is designed to satisfy the aforementioned needs. The poorly flowable materials feeding apparatus of the present invention permits dispensing of the materials from a supply hopper with minimum disturbance to the bulk material and without vibrating the material so as to reduce the chance of segregation of the material mixture. Also, the feeding apparatus facilitates the flow of material using mechanical elements which operate successfully in abrasive materials and have low initial and replacement cost. Further, the feeding apparatus avoids the imposition of any converging angles in the material flow path which minimizes the opportunity for the materials to bridge. Still further, the feeding apparatus has the capability of handling both high and low density materials.

Accordingly, the present invention is directed to an apparatus for feeding poorly flowable dry particulate materials. The material feeding apparatus comprises: (a) a rotary supply hopper having an annular sidewall defining an interior chamber for receiving and containing a quantity of material, the annular sidewall being open at a lower circular edge thereof; (b) a stationary platform having an upright central axis extending substantially perpendicular to the platform and an opening extending through the platform being spaced from the central axis; (c) support means for supporting the hopper above the platform to undergo rotation relative to the platform about the upright central axis with the lower circular edge of the supply hopper being disposed adjacent to the platform such that the platform serves as a stationary bottom for the rotary supply hopper; and (d) an annular hollow discharge spout attached at an open upper end to the platform below and encircling the opening through the platform and having a transfer passage extending from the open upper end to an open lower end so that material can undergo gravity-assisted flow downward through the platform opening and the spout passage for discharge at the open lower end of the discharge spout. Preferably, the stationary platform has a circular groove formed in a top surface thereof that encircle the upright central axis. The opening extends through the platform adjacent to the circular groove and spaced from the central axis. The opening is disposed between the circular groove and central axis. The lower circular edge of the hopper is spaced from and extends downward into the circular groove in the platform.

The material feeding apparatus also comprises first drive means drivingly coupled to the supply hopper for rotating the hopper relative to the platform about the upright central axis. The material feeding apparatus further comprises a stripper blade rotatably mounted to the discharge spout and extending radially inward at least partially across the open lower end of the discharge spout for engaging discharging material to assist its movement away from the open lower end of the discharge spout, and second drive means drivingly coupled to the stripper blade for rotatably moving the stripper blade relative to the discharge spout about the open lower end thereof.

Additionally, the material feeding apparatus comprises a rake member attached to and extending generally radially inward from the sidewall of the supply hopper adjacent to its open lower end for movement therewith through a path that carries the rake member over the platform opening to movably advance some of the materials in the supply hopper over the platform opening for gravity-assisted flow downwardly through the platform opening and into the discharge spout passage. The material feeding apparatus also comprises a longitudinal rib attached to the sidewall closer to an upper end than to the open lower end of the supply hopper and generally opposite from the rake member and projecting generally radially inward from the sidewall into the interior chamber to engage and move the material with the rotary supply hopper. The material feeding apparatus further comprises an elongated flexible cable attached at one end to the stripper blade and at an opposite end to the longitudinal rib and extending generally diagonally across the interior chamber of the supply hopper to make a path through the material that will break up any bridging of material at the open upper end of the discharge spout.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
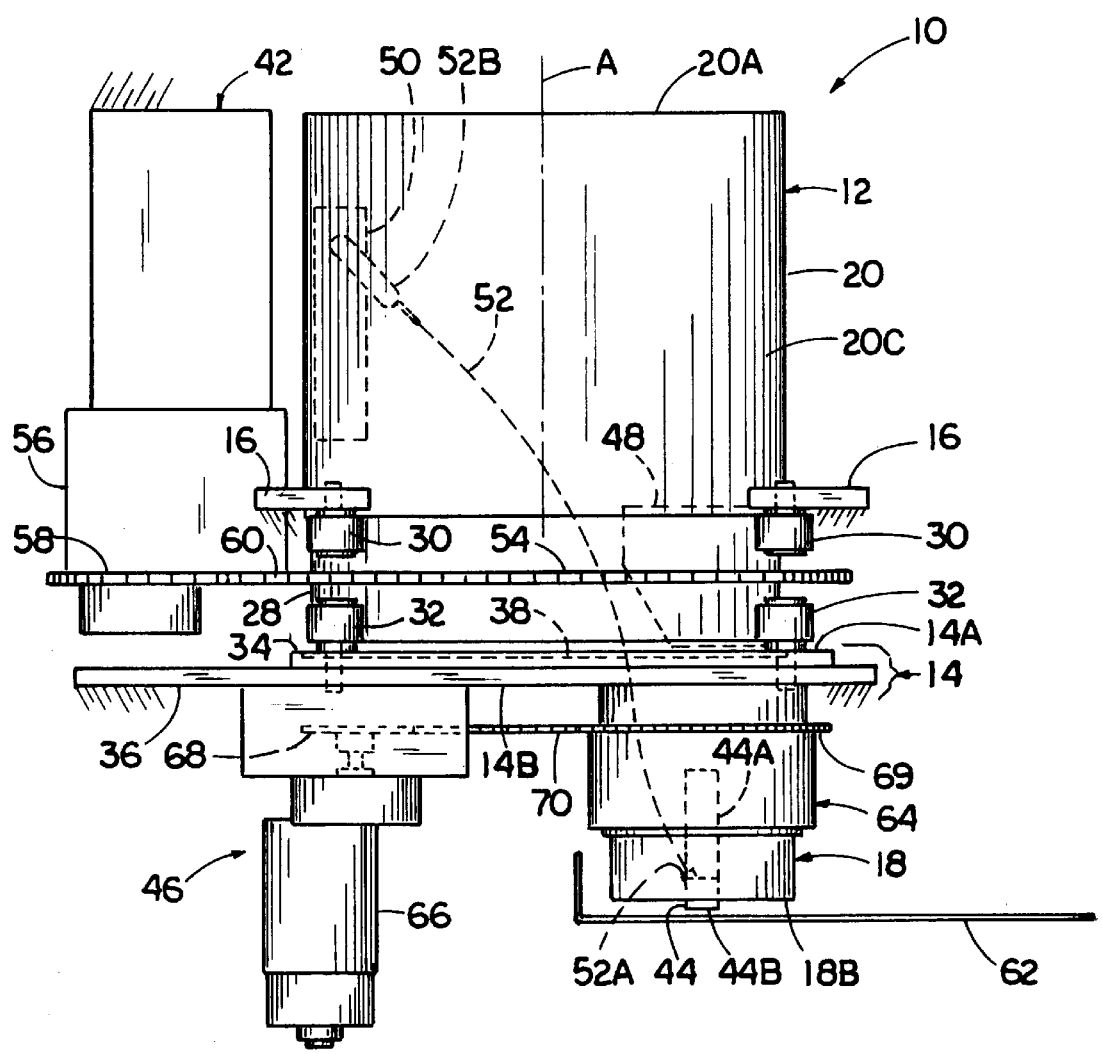
FIG. 1 is a side elevational view of a poorly flowable dry particulate materials feeding apparatus of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 2:
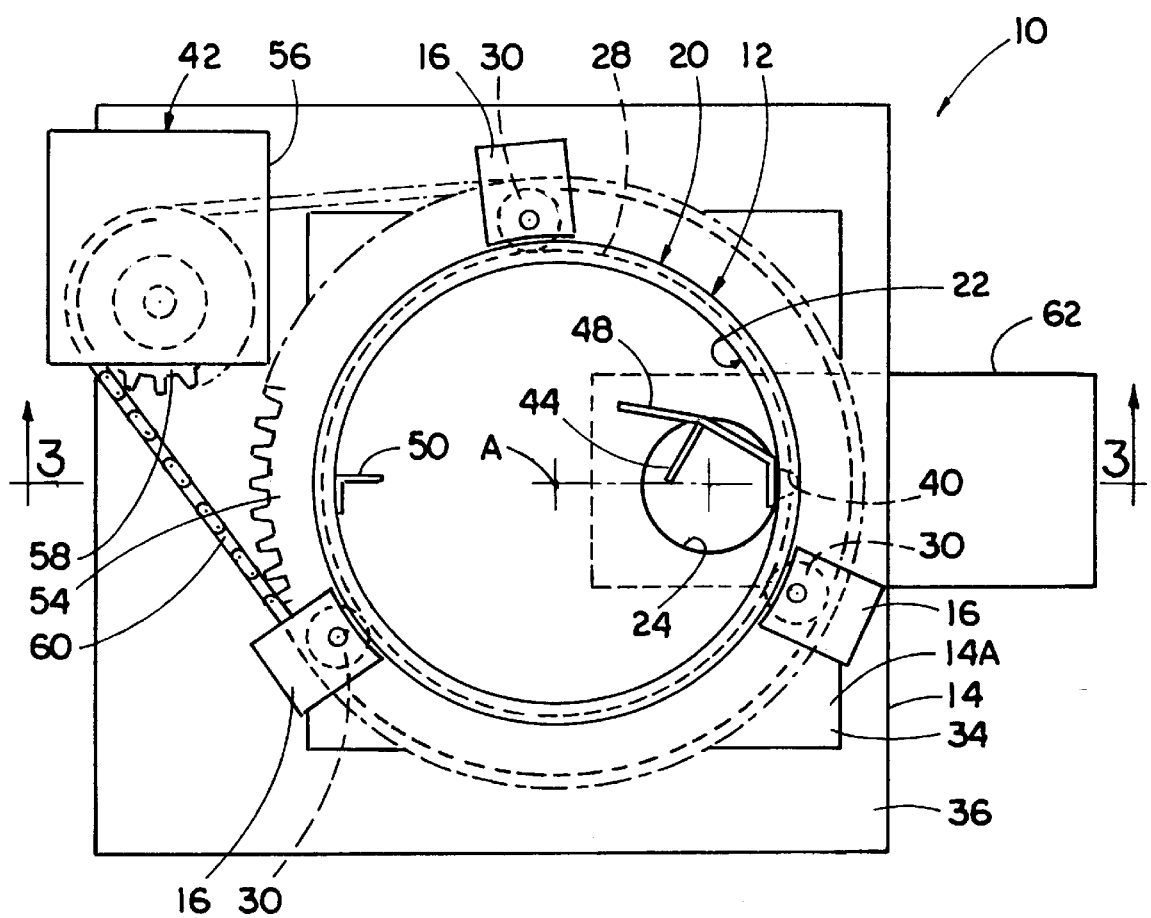
FIG. 2 is a top plan view of the material feeding apparatus of FIG. 1.
Figure 3:
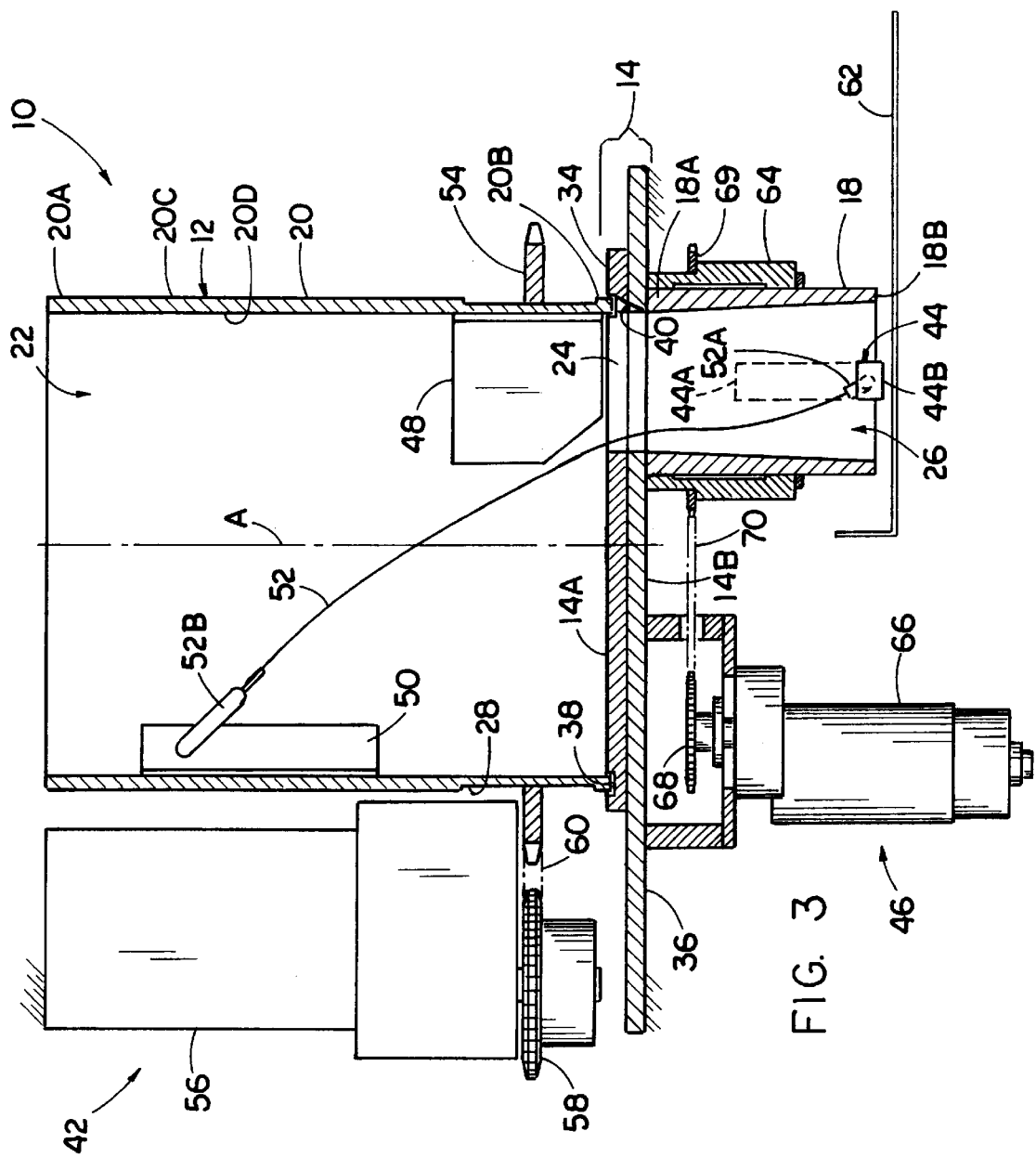
FIG. 3 is an enlarged vertical sectional view of the material feeding apparatus taken along line 3—3 of FIG. 2.

Referring now to the drawings, and particularly to FIGS. 1–3, there is illustrated an apparatus of the present invention, being generally designated 10, for feeding fibrous and other dry particulate materials with poor flowability characteristics. The material feeding apparatus 10 basically comprises a rotary supply hopper 12, a stationary platform 14, a support structure 16 and an annular hollow standpipe or discharge spout 18. The hopper 12 has an annular, preferably cylindrical, sidewall 20 forming an interior chamber 22 for receiving and containing a quantity of material in a bulk supply thereof. The annular sidewall 20 has at least a partially open upper edge 20A for dispensing the material into the hopper 12 and an entirely open lower circular edge 20B. The platform 14 is stationarily supported by any suitable means and is generally flat in shape. A discharge opening 24, preferably circular in shape, extends through the platform 14.

The hopper support structure 16, constituted by any suitable means, supports the hopper 12 above the platform 14 to undergo rotation relative to the stationary platform 14 about an upright central axis A extending generally perpendicular to the platform 14 and coaxially with a centerline of the hopper 12. The lower circular edge 20B of the sidewall 20 of the hopper 12 is disposed adjacent to a top surface 14A of the platform 14 such that the platform 14 serves as a stationary bottom for the rotary supply hopper 12. Preferably, although not necessarily, in one form the support structure 16 includes a recessed track 28 formed in and extending about an exterior surface 20C of the annular sidewall 20 of the hopper 14 and a plurality of upper bearings or rollers 30 stationarily positioned and circumferentially displaced about the sidewall 20 of the hopper, such as at 120° intervals, that are rotatably engaged within the recessed track 28 so as to rotatably support the supply hopper 12 in the desired position above the platform 14. There can be another plurality of lower bearings or rollers 32 spaced below the upper rollers 30 which are stationarily and rotatably mounted upon the platform 14 at circumferentially spaced intervals about the hopper 12 that rotatably engage within the recessed track 28 so as to further assist in rotatably supporting the hopper 12 at the desired position above the platform 14.

The annular hollow discharge spout 18 is attached at an open upper end 18A to a bottom surface 14B of the platform 14. The discharge spout 18 is located below and encircles the discharge opening 24 through the platform 14 and has a transfer passage 26 extending from the open upper end 18A to an open lower end 18B of the discharge spout 18. The discharge spout 18 is disposed tangentially to the cylindrical sidewall 20 of the supply hopper 12 and offset from the central axis A and coaxial centerline of the hopper 12. Material that passes over the platform discharge opening 24 will undergo gravity-assisted flow downward through the discharge opening 24 into and through the discharge spout transfer passage 26 for discharge at the open lower end 18A of the discharge spout 18. Preferably, although not necessarily, the discharge spout 18 is circular in cross-sectional shape and tapers outwardly in diameter as the discharge spout 18 extends downwardly from the bottom surface 14B of the platform 14. Such outwardly tapered or flared configuration creates a release angle that is approximately three degrees per side. The release angle reduces, if not eliminates, any tendency for the material to hang up within the discharge spout 18.

Preferably, although not necessarily, the stationary platform 14 can be constructed of an upper wear plate 34, made of a suitable material such as acetal plastic, and a lower base plate 36 supporting the upper wear plate 34. The stationary platform 14 preferably has a circular recess or groove 38 formed therein, such as in the upper wear plate 34, extending downward from the top surface 18A thereof. The circular groove 38 concentrically encircles the upright central axis A and has a diameter that is substantially equal to that of the hopper 12. The above-described support structure 16 supports the hopper 12 such that the lower circular edge 20B of its annular sidewall 20 is spaced from and extends downward into and moves around the circular groove 38 in the stationary platform 14. The spacing or clearance between the lower circular edge 20B and groove 38 is a few thousandths of an inch which minimizes leakage of material from the hopper. It is anticipated that some material will tend to accumulate in the groove 38. However, a small hole 40 is provided in the portion of the circular groove 38 located adjacent to the discharge opening 24 in the platform 14 which leads from the groove 38 to the transfer passage 26 of the discharge spout 18 to allow the flow to the discharge spout 18 of any material that accumulates in the circular groove 38. As can be appreciated, the small hole 40 serves as a self-cleaning feature for the circular groove 38. The aforementioned discharge opening 24 extending through the platform 14 is located adjacent to the circular groove 38 and spaced from the central axis A. The circular groove 38 is defined by a radius extending from central axis A that is greater than the diameter of the circular discharge opening 24 such that the opening 24 is disposed between central axis A and groove 38 and is offset from the central axis A.

Additionally, the material feeding apparatus 10 includes first drive means 42, a stripper blade 44, second drive means 46, a rake member 48, a longitudinal rib 50 and an elongated flexible cable 52. The first drive means 42 is drivingly coupled to the rotary supply hopper 12 for rotating the hopper 12 relative to the stationary platform 14 about the upright central axis A. Preferably, although not necessarily, the first drive means 42 includes an annular driven sprocket 54 attached to and extending circumferentially about the sidewall 20 of the hopper 12 between the upper and lower plurality of rollers 30, 32 and a gearmotor 56 stationarily disposed adjacent to the hopper 12. The gearmotor 56 has a drive sprocket 58 drivingly coupled, such as by a drive chain 60, to the driven sprocket 54 for drivingly rotating the driven sprocket 54 and therewith the supply hopper 12 about the upright central axis A.

The stripper blade 44 is rotatably mounted to the discharge spout 18 and extends radially inward across its open lower end 18B for engaging material discharging therefrom to assist its movement away from the open lower end 18B of the discharge spout 18 and onto any suitable transfer means 62, such as a flatbed trough, belt or gravity chute. The second drive means 46 is drivingly coupled to the stripper blade 44 for rotatably moving the stripper blade 44 relative to the discharge spout 18 about the open lower end 18B thereof. More particularly, the stripper blade 44 has a vertical portion 44A attached to a collar or hub 64 rotatably mounted about the discharge spout 18, and a horizontal portion 44B extending at a generally right angle from the vertical portion 44A and angularly across the open lower end 18B of the discharge spout 18. The second drive means 44 preferably, although not necessarily, includes a stationarily positioned motor 66 having a rotary output sprocket 68 and a flexible drive member, such as chain 70, entrained over the rotary output sprocket 68 and about a driven sprocket 69 attached to the hub 64 for transmitting rotary motion from the motor 66 to the hub 64 and thereby to the stripper blade 44. Alternatively, the above-described first and second drive means 42, 44 could be in the form of an arrangement of pulleys and drive belts. Preferably, the first drive means 42 and second drive means 46 are operable to respectively oppositely rotate the hopper 12 and the stripper blade 44 at different speeds. By way of example, the hopper 12 is rotated clockwise, as view in FIG. 2, and relatively slowly, such as from one to three rpms whereas the stripper blade 44 is rotated counterclockwise and somewhat faster, such as ten to fifteen rpms. Alternatively, they could be rotated in the same directions. In the preferred embodiment, the stripper blade 44 is angled to plow material radially outward from the center of the discharge spout 18 as the stripper blade 44 is rotated.

The rake member 48 is attached to and extends generally radially inward from the sidewall 20 of the supply hopper 12 into the interior chamber 22 thereof adjacent to the open lower edge 20B of the sidewall 20 for movement therewith through a path that carries the rake member 48 over the platform discharge opening 24 to plow and movably advance some of the materials in the supply hopper 12 over the platform opening 24 for gravity-assisted flow downwardly through the platform opening 24 and into the discharge spout transfer passage 26. Preferably, although not necessarily, the rake member 48 has a radial length approximately thirty percent of the radius of the circular groove 38 and has several bends therein. Thus, the function of the rake member 48 is to plow material into the discharge opening 24 and spout 18.

For assurance that the material in the interior chamber 22 rotates with the hopper 12, the longitudinal rib 50 is provided. The rib 50 is attached to the inside surface 20D of the annular sidewall 20. The rib 50 preferably is located closer to the upper edge 20A than to the open lower edge 20B of the supply hopper sidewall 20 and generally diametrically opposite from the rake member 48. The rib 50 projects generally radially inward from the sidewall 20 into the interior chamber 22 to engage and move the material with the rotation of the rotary supply hopper 12.

Figure 4:
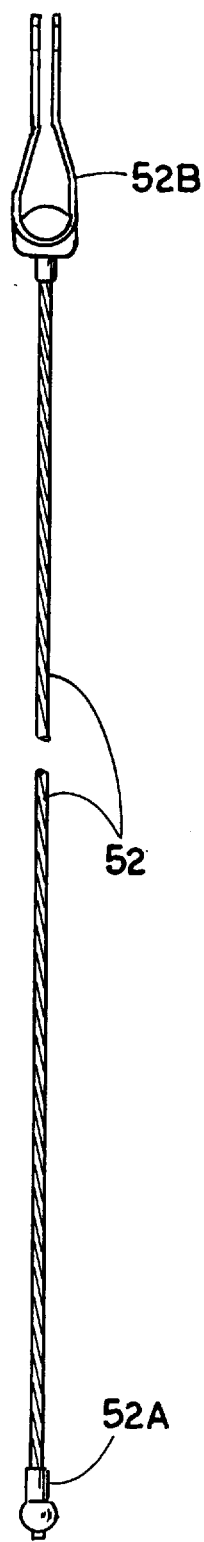
FIG. 4 is a fragmentary side elevational view of a cable employed in the material feeding apparatus that is seen in FIG. 3.
Figure 5:
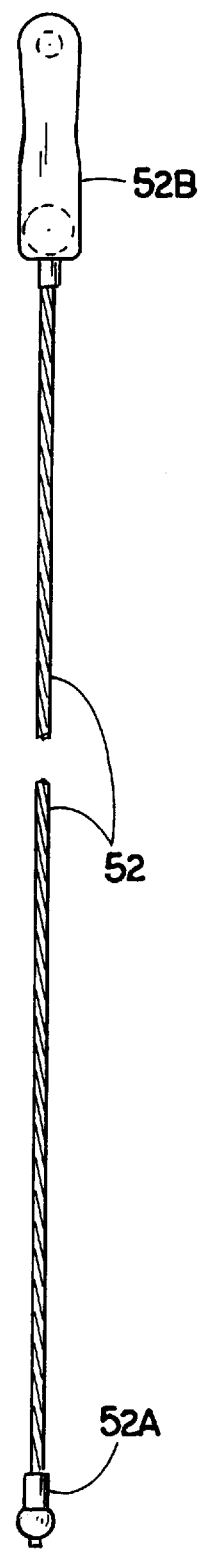
FIG. 5 is another fragmentary side elevational view of the cable employed in the material feeding apparatus.

Referring to FIGS. 3–5, the elongated flexible cable 52 is attached at one end 52A to the horizontal portion 44B of the stripper blade 44 and at an opposite end 52B to the longitudinal rib 50. The cable 52 extends through the discharge spout transfer passage 26 and the platform opening 24 and therefrom further extends generally diagonally across the interior chamber 22 of the supply hopper 12 such that as the hopper 12 rotates and the cable 52 moves therewith, it cuts and makes a path through the material that will break up any bridging of material at the open upper end 18A of the discharge spout 18. The flexible cable 52 at the one end 52A is universally rotatably attached, such as by a swivel connector, to the stripper blade 44 and at the opposite end 52B is rotatably attached respectively to the longitudinal rib 50.

It should be understood that in the preferred embodiment, the cooperation of the rake member 48, the longitudinal rib 50 and the annualar sidwall 20 of hopper 12 causes the entire mass of material within the interior chamber 22 of the hopper 12 to slowly rotate along with the hopper 12 as the supply hopper 12 is rotated without causing disturbance to the material mixture. Then, as the material passes over the discharge opening 24 in the stationary platform 14, the material drops through the discharge spout 18 by the force of gravity and aided by the gentle turning of the flexible cable 52 whereby the feeding of poorly flowable dry particular materials is accomplished by the feed apparatus 10 without the need for aggressive stirring, tumbling or other agitation which can cause separation and segregation of the material as experienced with prior art machines. Further, it should be understood that the aforementioned groove 38, stripper blade 44, rake member 48, rib 50 and cable 52 can be employed in various combinations to provide the effective operation of the apparatus 10 in handling, feeding and dispensing a wide range of materials. Not all of the components need be present in and utilized by the apparatus 10 to handle all materials.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. Apparatus for feeding poorly flowable dry particulate materials, said apparatus comprising:

(a) a rotary supply hopper having an annular sidewall defining an interior chamber for receiving and containing a quantity of material, said annular sidewall being open at a lower circular edge thereof;

(b) a stationary platform having a circular groove formed in a top surface of said platform encircling an upright central axis extending substantially perpendicular to said platform and an opening extending through said platform adjacent to said circular groove, spaced from said central axis and disposed between said circular groove and said central axis;

(c) support means for supporting said supply hopper above said platform to undergo rotation relative to said platform about said upright central axis with said lower circular edge of said hopper sidewall being spaced from and extending downward into said circular groove in said platform such that said platform serves as a stationary bottom for said rotary supply hopper; and (d) an annular hollow discharge spout attached at an open upper end to said platform below and encircling said opening through said platform and having a transfer passage extending from said open upper end to an open lower end of said discharge spout so that material can undergo gravity-assisted flow downward through said platform opening and said discharge spout passage for discharge at said open lower end of said discharge spout.

2. The apparatus as recited in claim 1, further comprising:
drive means drivingly coupled to said supply hopper for rotating said hopper relative to said platform about said upright central axis.

3. The apparatus as recited in claim 2, wherein said drive means includes:
an annular driven sprocket attached to and circumferentially extending about said sidewall of said hopper; and
a gearmotor disposed adjacent to said hopper and having a drive sprocket drivingly coupled to said driven sprocket for drivingly rotating said driven sprocket and therewith said supply hopper about said upright central axis.

4. The apparatus as recited in claim 1, wherein said hollow discharge spout is substantially circular in cross-sectional shape and disposed tangentially to said lower circular edge of said sidewall of said hopper.

5. The apparatus as recited in claim 1, wherein said passage of said hollow discharge spout flares outwardly in diameter as said discharge spout extends downwardly from said platform.

6. The apparatus as recited in claim 1, further comprising:
a stripper blade rotatably mounted to said discharge spout and extending radially inward at least partially across said open lower end of said discharge spout for engaging discharging material to assist movement thereof away from said open lower end of said discharge spout.

7. The apparatus as recited in claim 6, further comprising:
first drive means drivingly coupled to said supply hopper for rotating said hopper relative to said platform about said upright central axis; and
second drive means drivingly coupled to said stripper blade for rotatably moving said stripper blade relative to said discharge spout about said open lower end thereon, said first drive means and second drive means being operable to respectively rotate said hopper and said stripper blade at different speeds.

8. The apparatus as recited in claim 6, further comprising:
a hub rotatably mounted about said discharge spout, said stripper blade being supported by said hub.

9. The apparatus as recited in claim 8, further comprising:
drive means drivingly coupled to said hub for rotatably moving said hub and said stripper blade therewith relative to said discharge spout about said open lower end thereof.

10. The apparatus as recited in claim 9, wherein said drive means includes a motor having a rotary output member and a flexible drive member entrained over said rotary output member and about said hub for transmitting rotary motion from said motor to said hub.

11. The apparatus as recited in claim 1, further comprising:
a rake member attached to and extending generally radially inward from said sidewall of said supply hopper into said interior chamber adjacent to said lower circular edge thereof for movement therewith through a path that carries said rake member over said platform opening to movably advance some of the materials in said hopper over said platform opening for gravity-assisted flow downwardly through said platform opening and into said discharge spout passage.

12. The apparatus as recited in claim 11, further comprising:
a longitudinal rib attached to said sidewall of said supply hopper closer to an upper end than to said lower circular edge of said hopper and generally opposite from said rake member and projecting generally radially inward from said sidewall into said interior chamber to engage and move the material with said rotary supply hopper.

13. The apparatus as recited in claim 1, further comprising:
a longitudinal rib attached to said sidewall of said supply hopper closer to an upper end than to said lower circular edge of said hopper and generally opposite from said rake member and projecting generally radially inward from said sidewall into said interior chamber to engage and move the material with said rotary supply hopper.

14. The apparatus as recited in claim 13, further comprising:
a stripper blade rotatably mounted to said discharge spout and extending radially inward at least partially across said open lower end of said discharge spout for engaging discharging material to assist movement thereof away from said open lower end of said discharge spout.

15. The apparatus as recited in claim 14, further comprising:
an elongated flexible cable attached at one end to said stripper blade and at an opposite end to said longitudinal rib and extending through said discharge spout passage and platform opening and generally diagonally across said interior chamber of said supply hopper to make a path through the material that will break up any bridging of material at said open upper end of said discharge spout.

16. The apparatus as recited in claim 15, wherein said flexible cable at said one end is rotatably attached to said stripper blade and at said opposite end is rotatably attached respectively to said longitudinal rib.

17. The apparatus as recited in claim 1, wherein said support means includes:
a track formed about an exterior surface of said sidewall of said hopper; and
a plurality of rollers stationarily positioned and circumferentially displaced about said sidewall of said hopper and movably engaged with said track so as to rotatably support said hopper above said platform.

18. The apparatus as recited in claim 1, wherein a portion of said circular groove located adjacent to said platform opening has a hole leading to said discharge spout passage to allow movement thereto of any material accumulated in said circular groove.

19. Apparatus for feeding poorly flowable dry particulate materials, said apparatus comprising:
(a) a rotary supply hopper having an annular sidewall defining an interior chamber for receiving and containing a quantity of material, said annular sidewall being open at a lower edge thereof;

(b) a stationary platform having an upright central axis extending substantially perpendicular to said platform and an opening extending through said platform being spaced from said central axis;

(c) support means for supporting said supply hopper above said platform to undergo rotation relative to said platform about said upright central axis of said platform such that said platform serves as a stationary bottom for said rotary supply hopper;

(d) an annular hollow discharge spout attached at an open upper end to said platform below and encircling said opening through said platform and having a transfer passage extending from said open upper end to an open lower end of said discharge spout so that material can undergo gravity-assisted flow downward through said platform opening and said discharge spout passage for discharge at said open lower end of said discharge spout; and (e) a stripper blade rotatably mounted to said discharge spout and extending radially inward at least partially across said open lower end of said discharge spout for engaging discharging material to assist movement thereof away from said open lower end of said discharge spout.

20. The apparatus as recited in claim 19, further comprising:

drive means drivingly coupled to said supply hopper for rotating said hopper relative to said platform about said upright central axis.

21. The apparatus as recited in claim 19, wherein said hollow discharge spout is substantially circular in cross-sectional shape and disposed tangentially to said lower circular edge of said sidewall of said hopper.

22. The apparatus as recited in claim 19, wherein said passage of said hollow discharge spout flares outwardly in diameter as said discharge spout extends downwardly from said platform.

23. The apparatus as recited in claim 19, further comprising:

first drive means drivingly coupled to said supply hopper for rotating said hopper relative to said platform about said upright central axis; and second drive means drivingly coupled to said stripper blade for rotatably moving said stripper blade relative to said discharge spout about said open lower end thereon, said first drive means and second drive means being operable to respectively rotate said hopper and said stripper blade at different speeds.

24. The apparatus as recited in claim 19, further comprising:

a hub rotatably mounted about said discharge spout, said stripper blade being supported by said hub; and drive means drivingly coupled to said hub for rotatably moving said hub and said stripper blade therewith relative to said discharge spout about said open lower end thereof.

25. The apparatus as recited in claim 19, further comprising:

a longitudinal rib attached to said sidewall of said supply hopper closer to an upper end than to said lower circular edge of said hopper and projecting generally radially inward from said sidewall into said interior chamber to engage and move the material with said rotary supply hopper.

26. The apparatus as recited in claim 25, further comprising:

an elongated flexible cable attached at one end to said stripper blade and at an opposite end to said longitudinal rib and extending through said discharge spout passage and platform opening and generally diagonally across said interior chamber of said supply hopper to make a path through the material that will break up any bridging of material at said open upper end of said discharge spout.

27. The apparatus as recited in claim 26, wherein said flexible cable at said one end is rotatably attached to said stripper blade and at said opposite end is rotatably attached respectively to said longitudinal rib.

28. Apparatus for feeding poorly flowable dry particulate materials, said apparatus comprising:

(a) a rotary supply hopper having an annular sidewall defining an interior chamber for receiving and containing a quantity of material, said annular sidewall being open at a lower edge thereof;

(b) a stationary platform having an upright central axis extending substantially perpendicular to said platform and an opening extending through said platform being spaced from said central axis;

(c) support means for supporting said supply hopper above said platform to undergo rotation relative to said platform about said upright central axis of said platform such that said platform serves as a stationary bottom for said rotary supply hopper;

(d) an annular hollow discharge spout attached at an open upper end to said platform below and encircling said opening through said platform and having a transfer passage extending from said open upper end to an open lower end of said discharge spout so that material can undergo gravity-assisted flow downward through said platform opening and said discharge spout passage for discharge at said open lower end of said discharge spout; and (e) a rake member attached to and extending generally radially inward from said sidewall of said supply hopper into said interior chamber adjacent to said lower circular edge thereof for movement therewith through a path that carries said rake member over said platform opening to movably advance some of the materials in said hopper over said platform opening for gravity-assisted flow downwardly through said platform opening and into said discharge spout passage.

29. The apparatus as recited in claim 28, further comprising:

a longitudinal rib attached to said sidewall of said supply hopper closer to an upper end than to said lower circular edge of said hopper and generally opposite from said rake member and projecting generally radially inward from said sidewall into said interior chamber to engage and move the material with said rotary supply hopper.

30. The apparatus as recited in claim 29, further comprising:

a stripper blade rotatably mounted to said discharge spout and extending radially inward at least partially across said open lower end of said discharge spout for engaging discharging material to assist movement thereof away from said open lower end of said discharge spout.

31. The apparatus as recited in claim 30, further comprising:

an elongated flexible cable attached at one end to said stripper blade and at an opposite end to said longitudinal rib and extending through said discharge spout passage and platform opening and generally diagonally across said interior chamber of said supply hopper to make a path through the material that will break up any bridging of material at said open upper end of said discharge spout.

32. The apparatus as recited in claim 31, wherein said flexible cable at said one end is rotatably attached to said stripper blade and at said opposite end is rotatably attached respectively to said longitudinal rib.

33. The apparatus as recited in claim 30, further comprising:

first drive means drivingly coupled to said supply hopper for rotating said hopper relative to said platform about said upright central axis; and second drive means drivingly coupled to said stripper blade for rotatably moving said stripper blade relative to said discharge spout about said open lower end thereon, said first drive means and second drive means being operable to respectively rotate said hopper and said stripper blade at different speeds.

* * * * *